(12) United States Patent
Doi

(10) Patent No.: US 9,331,496 B2
(45) Date of Patent: May 3, 2016

(54) CONTACTLESS POWER-FEED EQUIPMENT

(75) Inventor: Yoshio Doi, Shiga (JP)

(73) Assignee: DAIFUKU CO., LTD. (JP)

( * ) Notice: Subject to any disclaimer, the term of this patent is extended or adjusted under 35 U.S.C. 154(b) by 539 days.

(21) Appl. No.: 13/533,097

(22) Filed: Jun. 26, 2012

(65) Prior Publication Data

US 2013/0002037 A1    Jan. 3, 2013

(30) Foreign Application Priority Data

Jun. 29, 2011 (JP) ................................. 2011-143629

(51) Int. Cl.
*H01F 38/14* (2006.01)
*H02J 5/00* (2016.01)

(52) U.S. Cl.
CPC ...................................... *H02J 5/005* (2013.01)

(58) Field of Classification Search
CPC ........................................................ H02J 5/005
USPC ............................................. 307/104; 361/113
See application file for complete search history.

(56) References Cited

U.S. PATENT DOCUMENTS

| | | | | |
|---|---|---|---|---|
| 6,515,878 B1* | 2/2003 | Meins | ...................... | B60L 5/005 191/10 |
| 7,109,602 B2* | 9/2006 | Nishino | .......................... | 307/17 |
| 7,119,311 B2 | 10/2006 | Makoto | .......................... | 219/661 |
| 8,050,068 B2 | 11/2011 | Hussman et al. | ................ | 363/97 |
| 8,907,527 B2 | 12/2014 | Nishino | .......................... | 307/104 |
| 2001/0012208 A1* | 8/2001 | Boys | ....................... | H02J 5/005 363/23 |
| 2005/0133497 A1 | 6/2005 | Makoto | .......................... | 219/624 |
| 2007/0109708 A1* | 5/2007 | Hussman | .................. | H02J 1/00 361/113 |
| 2008/0211478 A1 | 9/2008 | Hussman et al. | .............. | 323/355 |
| 2009/0003022 A1* | 1/2009 | Nunoya et al. | ................... | 363/78 |
| 2010/0277003 A1* | 11/2010 | Von Novak | ............. | H02J 17/00 307/104 |
| 2011/0241440 A1* | 10/2011 | Sakoda et al. | ................. | 307/104 |
| 2011/0299313 A1 | 12/2011 | Hussman et al. | .............. | 363/133 |

(Continued)

FOREIGN PATENT DOCUMENTS

| CN | 1468462 A | 1/2004 | .............. H02J 17/00 |
|---|---|---|---|
| CN | 1625017 A | 6/2005 | .............. H02J 17/00 |

(Continued)

OTHER PUBLICATIONS

Office Action (dated May 25, 2015) issued in connection with corresponding Chinese Patent Application No. 201210146210.2.

(Continued)

*Primary Examiner* — Jared Fureman
*Assistant Examiner* — Emmanuel R Dominique
(74) *Attorney, Agent, or Firm* — Kusner & Jaffe

(57) ABSTRACT

Contactless power-feed equipment includes: a power-supply device that outputs an AC constant current having a predetermined oscillation frequency to a main induction line; a primary coil provided on the main induction line connected to the power-supply device; a secondary coil that forms an insulating transformer with the primary coil and is connected in parallel with the sub induction line, a resonance capacitor that is connected in parallel with the secondary coil and constitutes a parallel resonant circuit with the sub induction line, and a switch provided between the secondary coil and the parallel resonant circuit. In the parallel resonant circuit, the sub induction line and the resonance capacitor have constants such that the parallel resonant circuit has a resonance frequency equal to the oscillation frequency of the power-supply device.

3 Claims, 3 Drawing Sheets

(56) References Cited

U.S. PATENT DOCUMENTS

| | | | | |
|---|---|---|---|---|
| 2012/0068552 A1* | 3/2012 | Nishino | ............. | H01F 38/14 |
| | | | | 307/104 |
| 2013/0119930 A1* | 5/2013 | Sakoda et al. | ............. | 320/108 |
| 2013/0257370 A1* | 10/2013 | Ichikawa | ............. | H02J 5/005 |
| | | | | 320/108 |

FOREIGN PATENT DOCUMENTS

| | | | | |
|---|---|---|---|---|
| CN | 1813396 A | 8/2006 | ............. | H02J 1/00 |
| JP | 2003-341390 | 12/2003 | ............. | B60M 7/00 |
| JP | 2009-072011 A | 2/2009 | ............. | H02J 17/00 |
| WO | WO2010147168 A1 | 12/2010 | ............. | H02J 17/00 |

OTHER PUBLICATIONS

English translation of Office Action (dated Jun. 2, 2015) issued in connection with corresponding Chinese Patent Application No. 201210146210.2 filed with Supplemental Information Disclosure Statement on Aug. 14, 2015.

Office Action received in corresponding Chinese Patent Application No. 201210146210.2, dated Nov. 19, 2015 (English translation provided).

Non-patent literature in Chinese Office Action: "Radio Foundation," Technical Schools Electronic Teaching Materials Compilation Committee, p. 1-16, Beijing: Labor and Human Resources Press (machine translated reference title; no text translation available).

\* cited by examiner

| PATTERN | INSULATING TRANSFORMER TURNS RATIO L3:L4 | L4 [μH] | V4 [V] | I3 [A] | I2 [A] |
|---|---|---|---|---|---|
| (1) | 1:1 | 24 | 120 | 15 | 83 |
| (2) | 6:5 | 19.2 | 92.5 | 15 | 66.8 |
| (3) | 3:2 | 13.8 | 76.2 | 20 | 51.1 |
| (4) | 2:1 | 11.4 | 58.1 | 20 | 37.4 |

FIG. 3

CONTACTLESS POWER-FEED EQUIPMENT

FIELD OF THE INVENTION

The present invention relates to contactless power-feed equipment and particularly relates to contactless power-feed equipment having a sub induction line branching from a main induction line.

BACKGROUND OF THE INVENTION

For example, conventional contactless power-feed equipment is disclosed in JP2003-341390A.

The contactless power-feed equipment disclosed in JP2003-341390A includes a main route for traveling of a carriage and a sub route branching from the main route. The carriage is retreated to the sub route during maintenance and so on.

To feed power to the carriage traveling on the main route or the sub route, a main induction line connected to a power-supply device for outputting a high-frequency current is provided along the main route, and a sub induction line connected to the main induction line is provided along the sub route.

A first switch (first magnet contactor) for switching a connected state and a cut-off state between the power-supply device and the main induction line is provided between the power-supply device and the main induction line. The sub induction line is connected in parallel with the first switch. Moreover, a second switch (second magnet contactor) for switching a connected state and a cut-off state of the sub induction line is provided on a feed line to the sub induction line.

The effect of the configuration will be discussed below.

Typically, the first switch is in a connected state and the second switch is in a cut-off state, electrically isolating the sub induction line from the main induction line. In this state, a high-frequency current is outputted from the power-supply device to the main induction line, so that the current passes through the overall main induction line and power is fed to carriages on the main route through pickup coils. The power fed from the main induction line is received by the carriages and drives motors, allowing traveling of the carriages on the main route to transport articles.

In the case where any one of the carriages on the main route undergoes maintenance, the target carriage is temporarily retracted from the main route to the sub route before maintenance, preventing the target carriage from interfering with other carriages traveling on the main route. In this case, the power-supply device is first temporarily stopped, the first switch is placed in a cut-off state, and the second switch is placed in a connected state, thereby connecting the main induction line and the sub induction line in series. In this state, the power-supply device is operated again to output a high-frequency current to the main induction line and the sub induction line. Thus, the current passes through the main induction line and the sub induction line to feed power to the target carriage through the pickup coil. At this point, the target carriage first receives power from the main induction line and travels from the main route to the sub route. After entering the sub route, the traveling target carriage receives power from the sub induction line.

After the target carriage is fully retracted to the sub route, the power-supply device is temporarily stopped again. Thus, the first switch is placed in a connected state and the second switch is placed in a cut-off state, electrically isolating the sub induction line from the main induction line. The operation of the power-supply device is then restarted to apply a high-frequency current to the main induction line, thereby feeding power to the carriages again on the main route.

With this configuration, when power is fed to the sub induction line used for temporarily retracting the carriage, the power can be fed to the sub induction line from the same power-supply device as the main induction line without providing another power-supply device for the sub induction line. Thus, power can be inexpensively fed to the carriage on the sub route with a small space.

In the contactless power-feed equipment described in JP2003-341390A, however, a circuit impedance greatly varies, when viewed from the power-supply device, between a state in which only the main induction line is connected to the power-supply device and a state in which the main induction line is connected to the power-supply device while the sub induction line is connected to the main induction line. Thus, when power to the sub induction line is supplied or cut off during an operation of the power-supply device, the circuit impedance of the power-supply device rapidly changes, leading to fluctuations in the current of the induction line. As a result, power cannot be sufficiently supplied to the carriages instantly or for a certain time, which may cause abnormal traveling of the carriages. Thus, as has been discussed, when power to the sub induction line is supplied or cut off, the power-supply device needs to be stopped. For this reason, each time power to the sub induction line is supplied or cut off, the power-supply device is stopped or restarted, leading to a complicated switching operation.

The first switch and the second switch are connected in series with the power-supply device, allowing a current outputted from the power-supply device to directly pass through the first switch and the second switch. Hence, the first switch and the second switch need large rated currents, disadvantageously increasing the cost and space of the switches.

SUMMARY OF THE INVENTION

An object of the present invention is to provide contactless power-feed equipment that can supply or cut off power to a sub induction line with a simple configuration without stopping a power-supply device and can reduce the rated current of a switch used for supplying or cutting off power to the sub induction line.

In order to attain the object, the present invention provides contactless power-feed equipment provided with a main induction line and a sub induction line that supply power to a pickup coil in a contactless manner by induction coupling, the contactless power-feed equipment being capable of switching supply and interruption of electric power from the main induction line to the sub induction line, the contactless power-feed equipment including:

a power-supply device that outputs an AC constant current having a predetermined oscillation frequency to the main induction line;

a primary coil connected to the main induction line;

a secondary coil that forms an insulating transformer with the primary coil and is connected to the sub induction line;

a resonance capacitor that is connected to the secondary coil and constitutes a parallel resonant circuit with the sub induction line; and a switch that is provided between the secondary coil and the parallel resonant circuit to switch supply/interruption of electric power to the sub induction line, wherein circuit constants of an inductance of the sub induction line and of a capacitance of the resonance capacitor are selected such that the parallel resonant circuit has a resonance frequency equal to the oscillation frequency of the power-supply device.

The contactless power-feed equipment of the present invention is preferably configured such that the primary coil, the secondary coil, and the sub induction line have equal inductances.

The contactless power-feed equipment of the present invention further includes a moving unit having the pickup coil, and a main route and a sub route on which the moving unit is capable of traveling, wherein the main induction line is capable of supplying power to the moving unit on the main route, the sub induction line is capable of supplying power to the moving unit on the sub route, and the primary coil, the secondary coil, and the sub induction line are preferably configured such that a current allowing traveling of the moving unit on the sub route is applied to the sub induction line based on receiving power from the sub induction line through the pickup coil.

According to the contactless power-feed equipment of the present invention, when the switch is placed in a cut-off state while an AC constant current having a predetermined oscillation frequency is outputted to the main induction line from the power-supply device, the sub induction line is cut off from the main induction line and no current passes through the sub induction line, thereby interrupting electric power supply to the sub induction line. When the switch is switched from a cut-off state to a connected state, the parallel resonant circuit is resonated at the same frequency as the oscillation frequency of the power-supply device to apply a current to the sub induction line, thereby supplying electric power to the sub induction line.

At this point, the parallel resonant circuit in a resonant state has a substantially infinite impedance. Even when the switch switches between a cut-off state and a connected state, a circuit impedance hardly changes when viewed from the power-supply device. Hence, even when the switch switches between a cut-off state and a connected state during an operation of the power-supply device, an excessive load is not placed on the power-supply device. Thus, power to the sub induction line can be supplied or interrupted without stopping the power-supply device.

When the switch is in a connected state, the parallel resonant circuit is in a resonant state. Thus, a current passing through the sub induction line and a current passing through the resonance capacitor in opposite directions cancel each other out. Consequently, a current passing through the switch is quite smaller than a current passing through the sub induction line, allowing the switch used for supplying or interrupting power to the sub induction line to have a low rated current. Therefore, the cost and space of the switch can be reduced.

Basically, the provision of the sub induction line capable of switching supply and interruption of power from the main induction line only requires the insulating transformer including the primary coil and the secondary coil, the switch, and the resonance capacitor. Thus, the equipment can be obtained with a simple configuration.

BRIEF DESCRIPTION OF THE DRAWINGS

FIG. 3 shows results when the turns ratios of a primary coil and a secondary coil of an insulating transformer are changed in the contactless power-feed equipment.

DESCRIPTION OF THE EMBODIMENT

Figure 1:
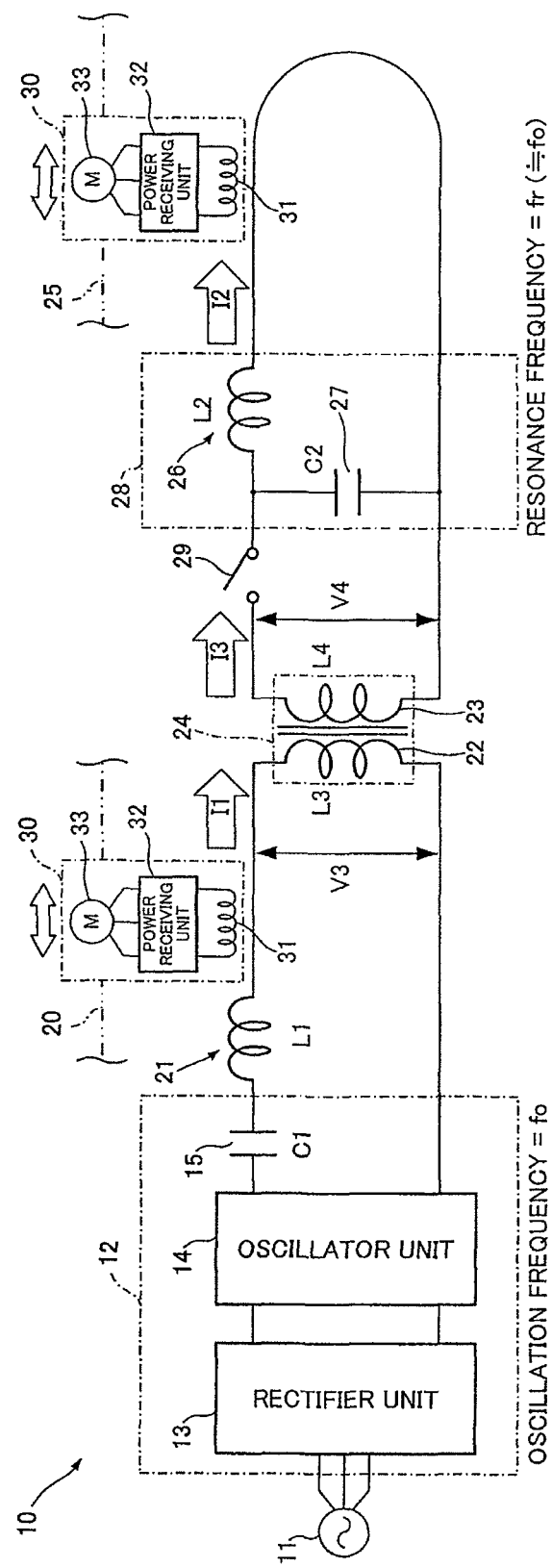
FIG. 1 is a circuit diagram illustrating contactless power-feed equipment according to an embodiment of the present invention.

An embodiment of the present invention will be described below with reference to the accompanying drawings.

First, an article transport system in FIG. 2 will be simply described below. The article transport system including contactless power-feed equipment 10 (FIG. 1) has a main route 20 for running multiple carriages 30, which serve as an example of a mobile unit. The main route 20 includes a loading section 38 for loading articles to the carriages 30 and an unloading section 39 for unloading articles from the carriages 30. When the carriage 30 traveling on the main route 20 reaches the loading section 38, the carriage 30 is loaded with articles in the loading section 38. When the carriage 30 traveling on the main route 20 reaches the unloading section 39, the articles loaded in the loading section 38 are unloaded in the unloading section 39.

In addition to the main route 20, a sub route 25 is provided that branches from the main route 20. The sub route 25 is simply stretched or extended from the main route 20 and allows traveling of the carriages 30 as on the main route 20.

A main induction line 21 and a sub induction line 26 are provided to feed power to the carriages 30 on the main route 20 and the sub route 25.

The main induction line 21 is provided along the main route 20 and is connected to a power-supply device that outputs a high-frequency AC current. The sub induction line 26 is provided along the sub route 25 and can be connected to or cut off from the main induction line 21 in a switchable manner. The sub induction line 26 can be fed with power from the power-supply device 12 through the main induction line 21. Thus, in principle, another power-supply device for the sub induction line 26 does not need to be provided in addition to the power-supply device 12 connected to the main induction line 21.

Figure 2:
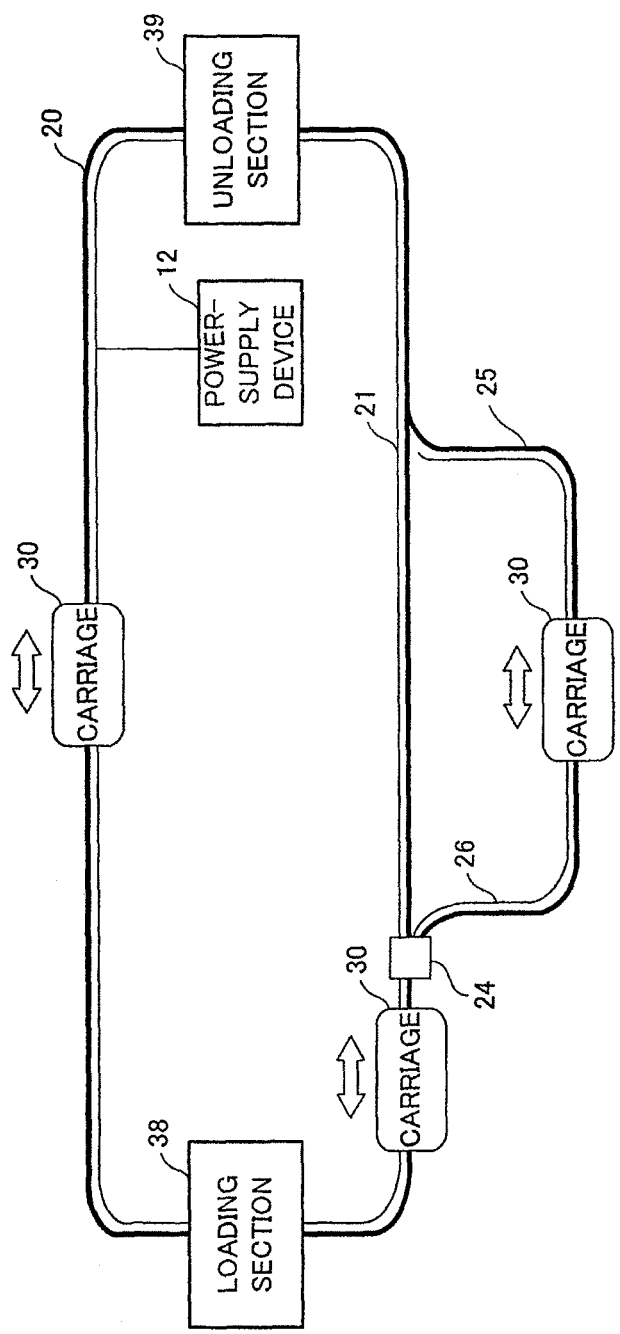
FIG. 2 is a traveling path diagram of an article transport system including the contactless power-feed equipment.

As illustrated in FIG. 1, each of the carriages 30 traveling on the main route 20 and the sub route 25 includes a pickup coil 31 that receives power by inductive coupling to the main induction line 21 or the sub induction line 26, a power receiving unit 32 that converts a voltage or current induced to the pickup coil 31 into a desired voltage or current and then outputs the converted voltage or current, a travel motor 33 that receives the desired voltage or current from the power receiving unit 32 and drives a drive mechanism (not shown) of wheels and so on, and a drive motor (not shown) that is driven as a power for loading and unloading articles.

Referring to FIG. 1, the circuit configuration of the contactless power-feed equipment 10 will be described in detail.

The power-supply device 12 converts an AC current inputted from a commercial power supply 11 into a high-frequency AC constant current having a predetermined oscillation frequency, and then outputs the current to the main induction line 21. The power-supply device 12 includes a rectifier unit 13 that rectifies the AC current from the commercial power supply 11 into a DC current, an oscillator unit 14 that receives the DC current from the rectifier unit 13 and outputs an AC current having the predetermined oscillation frequency, and a power-side capacitor 15 connected to the output side of the oscillator unit 14.

The main induction line 21 connected to the power-supply device 12 is also connected to a primary coil 22. A secondary coil 23 is provided to form an insulating transformer 24 with the primary coil 22. The secondary coil 23 is connected in parallel with a resonance capacitor 27. The sub induction line 26 is connected to the secondary coil 23 in parallel with the resonance capacitor 27. The sub induction line 26 and the resonance capacitor 27 constitute a parallel resonant circuit 28. The constants of the inductance of the sub induction line 26 and the capacitance of the resonance capacitor 27 are selected such that the resonance frequency of the parallel resonant circuit 28 is equal to the oscillation frequency of the power-supply device 12. Thus, the parallel resonant circuit 28 resonates at the same frequency as the oscillation frequency of the power-supply device 12, enabling efficient power supply to the sub induction line 26.

The primary coil 22, the secondary coil 23, and the sub induction line 26 have equal inductances, allowing a current passing through the sub induction line 26 to be equal to a current passing through the main induction line 21. Consequently, the carriages 30 on the sub route 25 can be fed with power and travel to load and unload articles as on the main route 20.

A switch 29 is provided between the secondary coil 23 and the parallel resonant circuit 28 to switch power supply and interruption to the sub induction line 26 by switching a connected state and a cut-off state. As has been discussed, the primary coil 22 connected to the main induction line 21 and the secondary coil 23 connected to the switch 29 are inductively coupled to each other while forming the insulating transformer 24.

The effect of the configuration will be discussed below.

When feeding to the sub induction line 26 is not necessary, the switch 29 is placed in a cut-off state. In this state, power is fed from the power-supply device 12 only to the main induction line 21 and the sub induction line 26 is opened and is cut off from the main induction line 21, resulting in no current flow to the sub induction line 26. In other words, power supply to the sub induction line 26 can be interrupted.

Therefore, when the switch 29 is in a cut-off state, power is only fed to at least one of the carriages 30 on the main route 20. This allows the carriages 30 on the main route 20 to receive power from the main induction line 21 through the pickup coil 31 and travel along the main route 20 to load and unload articles. At this point, even when the carriages 30 lie on the sub route 25, power is not supplied to the carriages 30 on the sub route 25 because no current passes through the sub induction line 26.

When the switch 29 is in a cut-off state, both ends of the secondary coil 23 are opened. Thus, a circuit impedance after the secondary coil 23 is substantially infinite when viewed from the power-supply device 12.

When feeding to the sub induction line 26 is necessary, the switch 29 is switched from a cut-off state to a connected state.

At this point, the inductance of the primary coil 22 is equal to that of the secondary coil 23. In other words, the number of turns of the primary coil 22 is equal to that of the secondary coil 23. Thus, an induced voltage on the secondary coil 23 is equal to a voltage across the primary coil 22 regardless of whether the switch 29 is in a cut-off state or a connected state.

For this reason, when the switch 29 is in a connected state, the induced voltage of the secondary coil 23 is applied to the sub induction line 26 and the resonance capacitor 27, the induced voltage being equal to the voltage across the primary coil 22.

The sub induction line 26 and the resonance capacitor 27 constitute the parallel resonant circuit 28 whose resonance frequency is equal to the oscillation frequency of the power-supply device 12. When the switch 29 is in a connected state, the parallel resonant circuit 28 is resonated at the same frequency as the oscillation frequency of the power-supply device 12. Thus, the sub induction line 26 is fed with an AC current having the same frequency as the oscillation frequency of the power-supply device 12.

In this case, the inductance of the secondary coil 23 is configured to be equal to that of the primary coil 22. Thus, a current passing through the sub induction line 26 can be equal to a current passing through the main induction line 21, that is, a current passing through the primary coil 22.

At this point, the parallel resonant circuit 28 in a resonant state has a substantially infinite impedance. Thus, even when the switch 29 switches between a cut-off state and a connected state, a circuit impedance after the secondary coil 23 hardly changes when viewed from the power-supply device 12. Hence, even when the switch 29 switches between a cut-off state and a connected state during an operation of the power-supply device 12, an excessive load is not placed on the power-supply device 12. This allows power to the sub induction line 26 to be supplied or interrupted independently from feeding to the main induction line 21 without stopping the power-supply device 12.

When the switch 29 is in a connected state, the parallel resonant circuit 28 is in a resonated state. Thus, a current passing through the sub induction line 26 and a current passing through the resonance capacitor 27 in opposite directions cancel each other out. Consequently, a current passing through the switch 29 is quite smaller than a current passing through the sub induction line 26, allowing the switch 29 used for supplying or interruption power to the sub induction line 26 to have a low rated current. Therefore, the cost and space of the switch 29 can be reduced. Moreover, in the case where the resonance capacitor 27 has a relatively small capacitance, a rush current applied to the switch 29 can be suppressed at the moment of the switching of the switch 29 from a cut-off state to a connected state.

Basically, the insulating transformer 24 including the primary coil 22 and the secondary coil 23, the switch 29, and the resonance capacitor 27 are only necessary for the provision of the sub induction line 26 on which power from the main induction line 21 is supplied and interrupted. Thus, a device for supplying and interrupting power to the sub induction line 26 can be obtained with a simple configuration.

When the switch 29 is in a connected state, the carriage 30 on the main route 20 travels to the sub route 25 while receiving power from the main induction line 21 through the pickup coil 31. After shifting from the main route 20 to the sub route 25, the carriage 30 traveling on the sub route 25 can receive power from the sub induction line 26 through the pickup coil 31.

The carriage 30 on the sub route 25 travels to the main route 20 while receiving power from the sub induction line 26 through the pickup coil 31. After shifting from the sub route 25 to the main route 20, the carriage 30 traveling on the main route 20 can receive power from the main induction line 21 through the pickup coil 31.

After the carriage 30 moves from the main route 20 to the sub route 25 or from the sub route 25 to the main route 20, the switch 29 switches from a connected state to a cut-off state. Thus, the sub induction line 26 is opened again, resulting in no current flow to the sub induction line 26. This ensures a safe operation near the sub route 25. Even in an emergency, the switch 29 placed in a cut-off state can quickly open the sub induction line 26, achieving high safety near the sub route 25.

EXPERIMENTAL EXAMPLE

An example of experimental results obtained with specific constants according to the embodiment will be described below. In the following explanation, C1 is the capacitance of the power-side capacitor 15, C2 is the capacitance of the resonance capacitor 27, L1 is the inductance of the main induction line 21, L2 is the inductance of the sub induction line 26, L3 is the inductance of the primary coil 22, L4 is the inductance of the secondary coil 23, I1 is a current passing through the main induction line 21, I2 is a current passing through the sub induction line 26, I3 is a current passing through the switch 29, V3 is a voltage across the primary coil 22, V4 is a voltage induced on the secondary coil 23, fo is the oscillation frequency of the oscillator unit 14 in the power-supply device 12, and fr is the resonance frequency of the parallel resonant circuit 28.

FIG. 3 shows an example of four patterns with different turns ratios of the insulating transformer 24.

First, "pattern (1)" in FIG. 3 (L3:L4=1:1) will be described below.

The set constants were C1=8.0 [μF], C2=12.5 [μF], L1=35 [μH], L2=22.5 [μH], L3=23 [μH], L4=24 [μH], and fo=9.96 [kHz]. I1 was set to 85 [A] under constant current control. V3 at this point was set to 120 [V].

In order to equalize the inductances L3 and L4, the number of turns of the primary coil 22 was equalized with that of the secondary coil 23. Thus, V4 was 120 [V], which was equal to V3.

When the switch 29 was in a cut-off state, the sub induction line 26 was opened, so that I2 was 0 [A]. When the switch 29 switched from the cut-off state to a connected state, I2 was 83 [A], which was equal to I1.

Therefore, it was confirmed that the carriage 30 on the sub route 25 can be fed with power as on the main route 20. This allowed the carriage 30 on the sub route 25 to perform the same operation as on the main route 20 in addition to simple traveling on the sub route 25.

When the switch 29 in a cut-off state was switched to a connected state, the confirmed I3 was 15 [A], which was quite smaller than I2. Thus, it was confirmed that the rated current of the switch 29 can be relatively small and the switch 29 requires lower cost and a smaller space. Since C2 was 12.5 [μF], which was relatively small, the rush current flowing to the switch 29 could be suppressed at the moment of the switching of the switch 29 from a cut-off state to a connected state.

Modification

The present invention is not limited to the embodiment and the experimental example and can be changed in various ways.

For example, in this embodiment, a current applied to the sub induction line 26 was equalized to a current on the main induction line 21 to cause the carriage 30 on the sub route 25 to perform the same operation as on the main route 20. A current applied to the sub induction line 26 may be however different from a current applied to the main induction line 21.

For example, different currents are applied to the induction lines when the carriage 30 undergoes maintenance on the sub route 25. In this case, the carriage 30 only requires an electric power for traveling on the sub route 25 and thus only an electric power for traveling of the carriage 30 needs to be supplied from the sub induction line 26 to the carriage 30.

Hence, a current passing through the sub induction line 26 can be smaller than a current passing through the main induction line 21, thereby reducing the steady-state loss of the sub induction line 26.

A current passing through the sub induction line 26 can be made smaller than a current passing through the main induction line 21 mainly by two methods:

The first method is to set an induced voltage on the secondary coil 23 to a voltage smaller than a voltage across the primary coil 22.

This method can be implemented when the number of turns of the secondary coil 23 is smaller than that of the primary coil 22, in other words, the inductance L4 of the secondary coil 23 is smaller than the inductance L3 of the primary coil 22.

Referring to FIG. 3, the first method will be specifically described below. The primary coil 22, the secondary coil 23, and the sub induction line 26 are selected on the premise that a current required for traveling of the carriage 30 passes through the sub induction line 26. The current I2 passing through the sub induction line 26 needs to be at least 50 [A] to enable traveling of the carriage 30.

In "pattern (2)" of FIG. 3, L3:L4=6:5 was determined (L3 was 23 [μH] and L4 was 19.2 [μH]). Thus, V4 was 92.5 [V], I2 was 66.8 [A], and I3 was 15 [A]. In this case, I2 was at least 50 [A], allowing the carriage 30 to travel on the sub route 25.

In "pattern (3)" of FIG. 3, L3:L4=3:2 was determined (L3 was 23 [μH] and L4 was 13.8 [VH]). Thus, V4 was 76.2 [V], I2 was 51.1 [A], and I3 was 20 [A]. In this case, I2 was at least 50 [A], allowing the carriage 30 to travel on the sub route 25.

In "pattern (4)" (failure example) of FIG. 3, L3:L4=2:1 was determined (L3 was 23 [μH] and L4 was 11.4 [μH]). Thus, V4 was 58.1 [V], I2 was 37.4 [A], and I3 was [A]. In this case, I2 was smaller than 50 [A], which may preclude traveling of the carriage 30.

Therefore, in the case where a current of at least 50 [A] needs to be applied to enable the carriage 30 to travel on the sub route 25, the primary coil 22 and the secondary coil 23 are desirably selected so as to determine 1≤L3/L4≤1.5.

In the adoption of the first method, the insulating transformer 24 preferably includes a first terminal for using the sub route 25 in a similar manner to the main route 20, that is, for applying the same current as on the main induction line 21 to the sub induction line 26 and a second terminal for using the sub route 25 only for maintenance of the carriage 30, that is, for feeding only power for traveling of the carriage 30 to the sub induction line 26. The insulating transformer 24 as a unit including the first terminal and the second terminal can easily address changes of usage of the sub route 25 by switching a connection between the first terminal and the second terminal of the insulating transformer 24 on site.

The second method is to increase the inductance of the sub induction line 26.

The inductance of the sub induction line 26 can be increased by extending the line length of the sub induction line 26 or directly adding an inductor to the sub induction line 26.

In this case, however, the sub induction line 26 increased in inductance and the resonance capacitor 27 constitute the parallel resonant circuit 28 whose resonance frequency is equal to the oscillation frequency of the power-supply device 12. Thus, the capacitance of the resonance capacitor 27 needs to be adjusted according to the increased inductance of the sub induction line 26.

In the case where the resonance capacitor 27 is a variable capacitor that can be increased or reduced in capacitance, the resonance frequency of the parallel resonant circuit 28 can be easily adjusted by changing the capacitance of the variable capacitor on site.

Conversely, in the case where the line length of the sub induction line 26 may be shortened, in other words, the inductance of the sub induction line 26 may be reduced, a variable coil (variable inductor) may be connected in series with the sub induction line 26. In the case where the line length of the sub induction line 26 is shortened, the resonance frequency of the parallel resonant circuit 28 including the sub induction line 26, the variable coil, and the resonance capacitor 27 can be easily adjusted to the same frequency as the oscillation frequency of the power-supply device 12 by increasing the inductance of the variable coil on site.

In the foregoing embodiment, the main induction line 21 connected to the power-supply device 12 may be provided with the signal sub induction line 26 that can be switched between a connected state and a cut-off state from the main induction line 21. Alternatively, the main induction line 21 connected to the power-supply device 12 may be provided with at least two sub induction lines 26 that can be switched between a connected state and a cut-off state from the main induction line 21.

In this case, the number of primary coil 22 connected in series with the main induction line 21 is increased with the number of sub induction lines 26. A circuit configuration following the secondary coil 23 is identical to that of the embodiment.

Even in the case where the sub induction line 26 is switched between a connected state and a cut-off state from the main induction line 21, a circuit impedance remains infinite and hardly changes when viewed from the power-supply device 12. Thus, even in the case where power to the multiple sub induction lines 26 is optionally supplied or interrupted during an operation of the power-supply device 12, an excessive load is not placed on the power-supply device 12.

The present invention is suitable for moving or pooling multiple mobile units (carriages) on a sub route branching from a main route, and is particularly useful for feeding or interrupting power to the mobile units on the sub route during feeding to the mobile units on the main route.

What is claimed is:

1. Contactless power-feed equipment provided with a main induction line and a sub induction line that respectively functions as a primary side to supply power to a pickup coil that functions as a secondary side in a contactless manner by induction coupling, the contactless power-feed equipment being capable of switching supply and interruption of electric power from the main induction line to the sub induction line, the contactless power-feed equipment comprising:

a power-supply device that outputs an AC constant current having a predetermined oscillation frequency to the main induction line;

a primary coil connected to the main induction line;

a secondary coil that forms an insulating transformer with the primary coil and is connected to the sub induction line, wherein the primary coil is inductively coupled to the secondary coil such that a voltage in the primary coil induces a voltage in the secondary coil;

a resonance capacitor that is connected in parallel with the secondary coil and constitutes a parallel resonant circuit with the sub induction line; and a switch that is provided between the secondary coil and the parallel resonant circuit to switch supply and interruption of electric power to the sub induction line wherein the switch is connected in series with the secondary coil, wherein circuit constants of an inductance of the sub induction line and of a capacitance of the resonance capacitor are selected such that the parallel resonant circuit has a resonance frequency equal to the oscillation frequency of the power-supply device.

2. The contactless power-feed equipment according to claim 1, wherein the primary coil, the secondary coil, and the sub induction line have equal inductances.

3. The contactless power-feed equipment according to claim 1, further comprising a moving unit having the pickup coil, and a main route and a sub route on which the moving unit is capable of traveling, wherein the main induction line is capable of supplying power to the moving unit on the main route, the sub induction line is capable of supplying power to the moving unit on the sub route, and the primary coil, the secondary coil, and the sub induction line are configured such that a current enabling traveling of the moving unit on the sub route is applied based on receiving power from the sub induction line through the pickup coil.

* * * * *